United States Patent Office 3,652,638
Patented Mar. 28, 1972

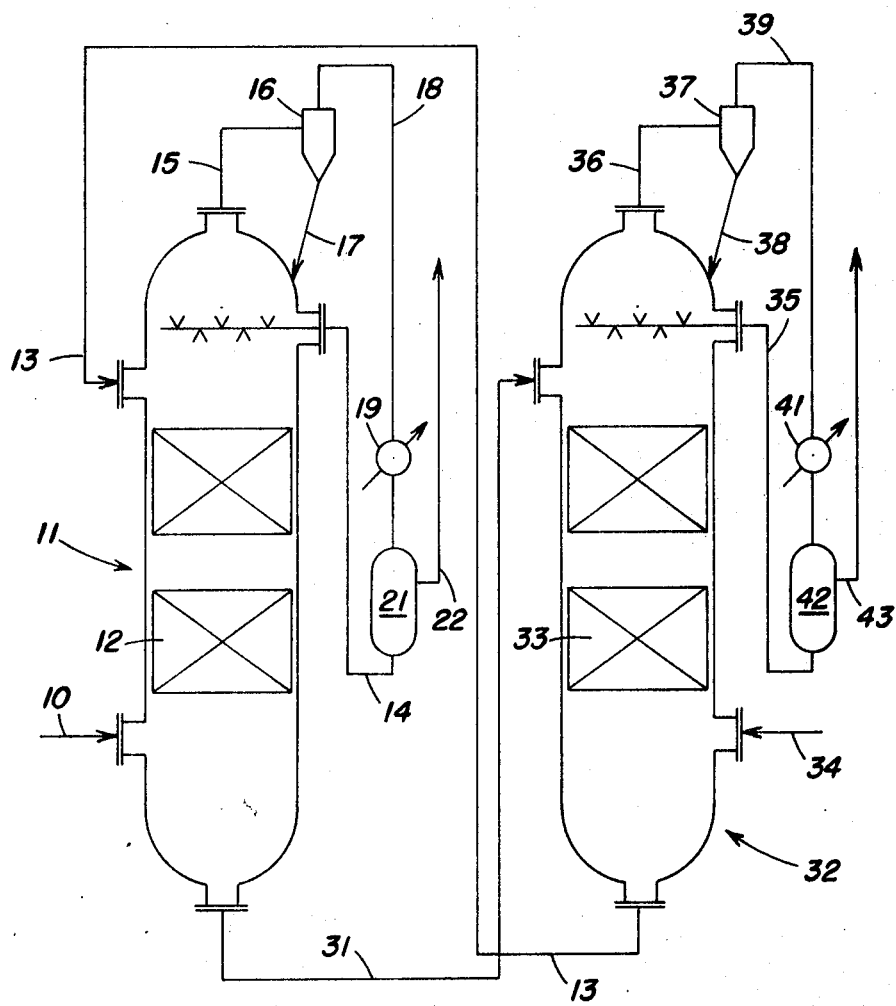

3,652,638
NITRILE PRODUCTION
Herbert Riegel, Maplewood, N.J., Harvey D. Schindler, New York, N.Y., and Morgan C. Sze, Upper Montclair, N.J., assignors to The Lummus Company, Bloomfield, N.J.
Filed Dec. 9, 1968, Ser. No. 782,020
Int. Cl. C07c *121/02*
U.S. Cl. 260—465.3    28 Claims

ABSTRACT OF THE DISCLOSURE

Process for producing nitriles by contacting a hydrocarbon containing feed, such as an alkane, alkene or alkyl-substituted aromatic hydrocarbon, with ammonia and either oxygen and a melt containing a multivalent metal halide in both its higher and lower valence state, such as a mixture of copper chlorides; or a melt containing a multivalent metal halide in both its higher and lower valence state and the corresponding metal oxyhalide in the absence or presence of oxygen.

---

This invention relates to the production of nitriles and more particularly to the production of nitriles by ammoxidation of a hydrocarbon feed.

The ammoxidation of hydrocarbons to produce nitriles is generally effected in the presence of a metal oxide catalyst. Thus, for example, acrylonitrile is produced by reacting propylene with ammonia and oxygen in the presence of a suitable metal oxide catalyst. The ammoxidation processes heretofore employed in the art require the presence of oxygen in the reaction mixture and consequently are limited by the necessity of avoiding explosive compositions. In addition, the production of unsaturated aliphatic hydrocarbon nitriles requires an olefinic feed which increases overall costs.

An object of this invention is to provide a new and improved process for producing nitriles.

Another object of this invention is to provide a new and improved process for producing nitriles by ammoxidation of hydrocarbons.

A further object tof this invention is to provide a process for the production of unsaturated aliphatic hydrocarbon nitriles from saturated aliphatic hydrocarbons.

These and other objects of the invention should be more readily apparent from the following detailed description thereof when read with reference to the accompanying drawing wherein:

The drawing is a simplified schematic flow diagram of an embodiment of the invention.

The objects of this invention are broadly accomplished by producing a nitrile by contacting a hydrocarbon containing feed and ammonia with a melt containing a multivalent metal halide in both its higher and lower valence state. The contacting is effected in the presence of an oxygen-containing gas and/or the melt is previously contacted with an oxygen-containing gas whereby the melt includes the corresponding oxyhalide of the metal.

The melt contains a halide of a multivalent metal; i.e., a metal having more than one positive valence state, such as manganese, iron, copper, cobalt, and chromium, preferably a chloride or bromide of the metal, with the copper chlorides and bromides, in particular the copper chlorides, being preferred. In the case of higher melting multivalent metal halides, such as copper chlorides, a halide of a univalent metal; i.e., a metal having only one positive valence state, which is nonvolatile and resistant to the action of oxygen under the process conditions is added to the multivalent metal halide to form a molten salt mixture having a reduced melting point. The univalent metal halides, the chlorides and bromides, particularly the chlorides, being preferred, are preferably alkali metal halides, such as potassium and lithium chloride in particular, but it is to be understood that other metal chlorides and mixtures thereof, such as the heavy metal halides of Groups I, II, III and IV of the Periodic Table; e.g., zinc, silver, and thallium chloride, may also be employed. The univalent metal halides are generally added in an amount sufficient to adjust the melting point of the molten salt mixture to a temperature of below about 500° F., and in the case of a salt mixture of copper chloride and potassium chloride, the composition of the melt ranges between about 20% and about 40%, preferably about 30%, by weight, potassium chloride, with the remainder being copper chloride. It is to be understood, however, that in some cases the catalyst melt may have a melting point higher than 500° F., provided the catalyst remains in the form of the melt throughout the processing steps. It is further to be understood that the melt may contain a mixture of multivalent metal halides or other ammoxidation reaction promoters, such as halides, in particular chlorides, and oxides of antimony, bismuth, arsenic, molybdenum, manganese, uranium and phosphorus. In general, the chlorides of arsenic, antimony, manganese and uranium are used in the melt in an amount ranging from about 1% to about 5%, by weight, and bismuth chloride may be employed in an amount ranging from about 1% to about 10%, by weight. It is also to be understood that in some cases, metal halides may be maintained as a melt without the addition of a univalent metal halide.

The hydrocarbon of the feed is either: an alkane or alkene having from about 2 to about 18 carbon atoms, preferably from about 3 to about 6 carbon atoms, such as propane, propylene, isobutane, isobutylene, hexane, hexene and the like to produce an effluent containing an unsaturated hydrocarbon nitrile; or an alkyl substituted aromatic hydrocarbon (the aromatic nucleus may contain more than one alkyl group), with the aromatic nucleus preferably being benzene or naphthalene, and the alkyl group containing from about 1 to about 4 carbon atoms, preferably from about 1 to about 2 carbon atoms, such as toluene, the various xylenes, ethyl benzene, trimethyl benzenes, methyl naphthalenes, etc., to produce an aromatic nitrile. It is to be understood that the feed may contain two or more of such hydrocarbons. The preferred hydrocarbon feeds are: propane and/or propylene to produce acrylonitrile; isobutane and/or isobutylene to produce methacrylonitrile; and the various xylenes to produce the various phthalonitriles.

In accordance with one embodiment of the invention, the ammonia and hydrocarbon are contacted with the melt, containing the multivalent metal halide in both its higher and lower valence state, in the presence of an oxygen-containing gas, such as air. As an alternative procedure, the melt containing a mixture of a multivalent metal halide in both its higher and lower valence state, may be initially contacted with an oxygen-containing gas and the resulting product, containing the corresponding oxyhalide of the multivalent metal, is then contacted in a separate reaction zone with the hydrocarbon and ammonia. This procedure is of greater commercial value in that the oxygen requirements of the process may be provided without the necessity of having a hydro-carbon-oxygen mixture which eliminates the problems associated with such mixtures. It is to be understood, however, that an oxygen-containing gas may also be employed in conjunction with the oxyhalide-containing melt in order to further meet oxygen requirements.

The nitrile production, as hereinabove described, is generally effected at temperatures from about 500° F.

to about 1200° F., preferably from about 600° F. to about 900° F. when employing an alkalene or an alkyl substituted aromatic hydrocarbon as the hydrocarbon feed and at temperatures from about 700° F. to about 1200° F., preferably from about 750° F. to about 1100° F. when employing an alkane as the hydrocarbon feed. The contacting is employing an alkane as the hydrocarbon feed. The contacting is preferably effected in a countercurrent fashion, with the feed as a continuous vapor phase, at residence times from about 1 to about 100 seconds and pressures from about 1 to about 30 atmospheres.

The hydrocarbon and ammonia reactants are generally employed in about stoichiometic proportions, although amounts greater or less than the stoichiometric proportions may be employed. In general, the hydrocarbon is not employed in an amount which is more than about 5% greater than stoichiometric proportions and the more ratio of ammonia to hydrocarbon generally does not exceed about 10:1. In the embodiment of the invention wherein an oxygen-containing gas is employed in admixture with the hydrocarbon, the mixture is regulated to avoid explosive compositions. In the embodiment of the invention wherein the melt is previously contacted with an oxygen-containing gas, the oxygen is generally absorbed in the melt in an amount sufficient to meet reaction requirements.

The melt, containing the multivalent, metal halide, does not behave only as a catalyst and, herefore, the multivalent metal halide must be present in an amount sufficient to meet reaction requirements. In the embodiment of the invention wherein all of the oxygen requirements of the process are provided by the oxyhalide of the metal, which is produced by contacting the melt with an oxygen-containing gas, the melt should contain at least about 20%, by weight, of the higher valent metal halide in order to both provide and solubilize the amount of oxyhalide required for the reaction. The melt may contain as little as 5%, by weight, of the higher valent metal halide metal halide, although greater amounts are preferred, if all or a portion of the oxygen requirements are provided by admixing an oxygen-containing gas with the hydrocarbon feed. It is to be understood, however, that lower amounts of the higher valent metal halide than hereinabove described may be employed by the use of high melt circulation rates and, therefore, the scope of the invention is not limited by such amounts.

The melt in addition to functioning as a reactant and/or catalyst is a temperature regulator. Thus, the circulating melt has a high heat absorption capacity thereby preventing runaway reaction during the exothermic ammoxidation and oxygen contacting steps. The absorbed heat of reaction may be employed to heat the various reactants to reaction temperature. Alternatively, or in addition to such an expedient, the melt may be contacted with an inert gas coolant to remove any additional heat of reaction, with the inert gas being subsequently cooled and re-employed for removing heat from the melt. It should be apparent, however, that if additional heating and/or cooling is required such heating and/or cooling may be effected in any of a wide variety of ways. In addition, the heat absorption capacity functions to maintain isothermal conditions during the reaction.

The invention will now be further described with reference to an embodiment thereof illustrated in the accompanying drawing. It is to be understood, however, that the scope of the invention is not to be limited thereby.

Referring now to the drawing, an oxygen-containing gas in line 10, such as air, is introduced into a reactor 11, containing suitable packing 12 or other liquid-vapor contacting devices. A melt containing a multivalent metal halide in both its higher and lower valence state, such as a mixture of cupric and cuprous chlorides, is introduced into reactor 11 through line 13 in the form of a melt and countercurrently contacts the ascending oxygen-containing gas. The melt may further contain an alkali metal chloride, such as potassium chloride. As a result of such contact, a portion of the cuprous chloride is exothermically converted to copper oxychloride.

An oxygen depleted gas in the top of the reactor 11 is contacted with a quench liquid introduced through line 14, resulting in condensation of vaporized melt and vaporization of quench liquor. The vaporized quench liquid and oxygen-depleted gas is withdrawn from reactor 11 through line 15 and introduced into a cyclone separator 16 to effect separation of entrained catalyst. The separated catalyst is withdrawn from separator 16 through line 17 and returned to the reactor 11. The combined oxygen-depleted gas-vaporized quench liquid is withdrawn from separator 16 through line 18, passed through condenser 19 to effect condensation of the quench liquid and the vapor-liquid mixture introduced into a separator 21. The quench liquid is withdrawn from separator 21 in line 14 and recycled to the reactor 11. The oxygen-depleted gas is withdrawn from separator 21 through line 22 and passed to waste.

The melt-containing a mixture of cuprous chloride, cupric chloride and copper oxychloride, is withdrawn from reactor 11 through line 31 and introduced into the top of an ammoxidation reactor 32, containing suitable packing 33 or other gas-liquid contact devices. A feed to be converted to a nitrile such as propane, and ammonia is introduced into the bottom of vessel 32 through line 34 and countercurrently contacts the descending melt to effect ammoxidation of the feed. The melt withdrawn from the bottom of vessel 32 through line 13 is now recycled to reactor 11.

A gaseous effluent, containing the nitrile, is contacted in the top of vessel 32 with a quench liquid introduced through line 35, resulting in condensation of vaporized catalyst melt and vaporization of the quench liquid. The vaporized quench liquid and effluent is withdrawn from vessel 32 through line 36 and introduced into a cyclone separator 37 to effect removal of entrained catalyst. The separated catalyst is withdrawn from separator 37 through line 38 and recycled to the vessel 32. The vaporized quench liquid and gaseous effluent are withdrawn from separator 37 through line 39, passed through condenser 41 to effect condensation and cooling of the quench liquid and the gas-liquid mixture introduced into a separator 42. The now cooled quench liquid is withdrawn from separator 42 through line 35 and recycled to the reactor 32. The effluent is withdrawn from separator 42 through line 43 and passed to separation and recovery.

It is to be understood that numerous variations of the hereinabove described processing sequence are possible within the spirit and scope of the invention. Thus, for example, the ammoxidation reaction may be effected in a single reactor having two separate zones, one for the introduction of an oxygen-containing gas for contact with the melt and the other for contacting the reuslting oxygenated melt with the feed to be converted to a nitrile. Alternatively, the ammoxidaion may be effected in a single vessel by introducing the oxygen-containing gas along with the hydrocarbon and ammonia. As a further modification, the second vessel may be used for cooling the melt by contacting the melt therein with an inert coolant gas. These and other modifications should be apparent to those skilled in the art from the teachings contained herein.

The invention is further illustrated by the following examples but the scope of the invention is not to be limited thereby:

EXAMPLE I

Acrylonitrile was produced by contacting propane, ammonia and air with a copper chloride containing melt which was previously contacted with a mixture containing 67% nitrogen and 33% oxygen.

The conditions and results were as follows:

| | |
|---|---|
| Reaction temperature, °C. | 471 |
| Reaction pressure, atm. | 1 |
| Molten salt, weight percent: | |
| KCl | 30 |
| CuCl | 40 |
| $CuCl_2$ | 30 |
| | 100 |
| Residence time, seconds | 4.8 |
| Duration of test, hours | 2.5 |
| Gas hourly space velocity, GHSV | 148 |
| Feed rate, gm.-mol/hr.: | |
| Propane | 0.20 |
| Ammonia | 0.070 |
| Air | 0.49 |
| Oxygen (in the salt) | 0.035 |
| Propane conversion, percent | 21 |

Products

| Component: | Mole percent propane converted |
|---|---|
| CO | 4.3 |
| $CH_4$ | 4.2 |
| $CO_2$ | 10.8 |
| $C_2H_4$ | 2.7 |
| $C_2H_6$ | 1.4 |
| $C_3H_6$ | 6.2 |
| $C_3H_3N$ (acrylonitrile) | 52.8 |
| $C_2H_3N$ (acetonitrile) | 17.6 |
| | 100.0 |

EXAMPLE II

Acrylonitrile is produced from propane by contacting the propane with a copper chloride melt, ammonia and air, without prior contacting of the melt with an oxygen-containing gas. The conditions are as follows:

| | |
|---|---|
| Reaction temperature, °C. | 494 |
| Reaction pressure, atm. | 5 |
| Molten salt, weight percent: | |
| KCl | 30 |
| CuCl | 50 |
| $CuCl_2$ | 20 |
| | 100 |
| Residence time, seconds | 44 |
| Duration of test, hours | 4 |
| Feed rate, gm.-mole/hr.: | |
| Hydrocarbon | 0.16 |
| Ammonia | 0.15 |
| Air (direct feed) | 1.5 |
| Oxygen (in salt) | None |

The reaction effluent contains acrylonitrile.

EXAMPLE III

Acrylonitrile is produced from propylene by contacting the propylene with a copper chloride melt, ammonia and air, the melt having been previously contacted with an oxygen-containing gas. The conditions are as follows:

| | |
|---|---|
| Reaction temperature, °C. | 446 |
| Reaction pressure, atm. | 5 |
| Molten salt, weight percent: | |
| KCl | 30 |
| CuCl | 55 |
| $CuCl_2$ | 15 |
| | 100 |
| Residence time, seconds | 3.0 |
| Duration of test, hours | 4 |
| Feed rate, gm.-mole/hr.: | |
| Hydrocarbon | 0.38 |
| Ammonia | 0.36 |
| Air (direct feed) | 1.91 |
| Oxygen (in salt) | 0.17 |

The reaction effluent contains acrylonitrile.

EXAMPLE IV

Methacrylonitrile is produced from isobutane by contacting the isobutane with a copper chloride melt and ammonia, the melt having been previously contacted with an oxygen-containing gas. The conditions are as follows:

| | |
|---|---|
| Reaction temperature, °C. | 474 |
| Reaction pressure, atm. | 3 |
| Molten salt, weight percent: | |
| KCl | 25 |
| CuCl | 50 |
| $CuCl_2$ | 25 |
| | 100 |
| Residence time, seconds | 45 |
| Duration of test, hours | 6 |
| Feed rate, gm.-mol/hr.: | |
| Hydrocarbon | 0.56 |
| Ammonia | 0.53 |
| Air (direct feed) | None |
| Oxygen (in salt) | 1.16 |

The reaction effluent contains methacrylonitrile.

EXAMPLE V

Benzonitrile is produced from toluene by contacting the toluene with a copper chloride melt, ammonia and air, the melt having been previously contacted with an oxygen-containing gas. The conditions are as follows:

| | |
|---|---|
| Reaction temperature, °C. | 440 |
| Reaction pressure, atm. | 2 |
| Molten salt, weight percent: | |
| KCl | 30 |
| CuCl | 45 |
| $CuCl_2$ | 25 |
| | 100 |
| Residence time, seconds | 40 |
| Duration of test, hours | 6 |
| Feed rate, gm.-mole/hr.: | |
| Hydrocarbon | 0.107 |
| Ammonia | 0.102 |
| Air (direct feed) | 0.535 |
| Oxygen (in salt) | 0.056 |

The reaction effluent contains benzonitrile.

EXAMPLE VI p-Phthalonitrile is produced from p-xylene by contacting the p-xylene with a copper chloride melt and ammonia, the melt having been previously contacted with an oxygen-containing gas. The conditions are as follows:

| | |
|---|---|
| Reaction temperature, °C. | 446 |
| Reaction pressure, atm. | 2 |
| Molten salt, weight percent: | |
| KCl | 30 |
| CuCl | 40 |
| $CuCl_2$ | 30 |
| | 100 |

Residence time, seconds _____ 6.0
Duration of test, hours _____ 6
Feed rate, gm.-mole/hr.:
   Hydrocarbon _____ 0.253
   Ammonia _____ 0.485
   Air (direct feed) _____ None
   Oxygen (in salt) _____ 0.80

The reaction effluent contains p-phthalonitrile.

EXAMPLE VII

The procedure of Example I is repeated except that the melt has the following composition:

| | Wt. percent |
|---|---|
| KCl | 30 |
| CuCl | 47 |
| $CuCl_2$ | 20 |
| $SbCl_3$ | 3 |
| | 100 |

The reaction effluent contains acrylonitrile.

EXAMPLE VIII

The procedure of Example II is repeated except that the melt has the following composition:

| | Wt. percent |
|---|---|
| KCl | 32 |
| CuCl | 45 |
| $CuCl_2$ | 20 |
| $MnCl_3$ | 3 |
| | 100 |

The reaction effluent contains acrylonitrile.

EXAMPLE IX

The procedure of Example III is repeated except that the melt has the following composition:

| | Wt. percent |
|---|---|
| KCl | 30 |
| CuCl | 43 |
| $CuCl_2$ | 22 |
| $BiCl_3$ | 5 |
| | 100 |

The reaction effluent contains acrylonitrile.

EXAMPLE X

The procedure of Example IV is repeated except that the temperature is 496° C. and the melt has the following composition:

| | Wt. percent |
|---|---|
| KCl | 32 |
| $FeCl_2$ | 56 |
| $FeCl_3$ | 7 |
| $UCl_4$ | 5 |
| | 100 |

The reaction effluent contains methacrylonitrile.

EXAMPLE XI

The procedure of Example X is repated except that the melt has the following composition:

| | Wt. percent |
|---|---|
| KCl | 30 |
| $FeCl_2$ | 59 |
| $FeCl_3$ | 8 |
| $AsCl_3$ | 3 |
| | 100 |

The reaction effluent contains methacrylonitrile.

EXAMPLE XII

The procedure of Example II is repeated except that the melt has the following composition:

| | Wt. percent |
|---|---|
| $MnCl_2$ | 3 |
| $MnCl_4$ | 80 |
| KCl | 17 |
| | 100 |

The reaction effluent contains acrylonitrile.

EXAMPLE XIII

The procedure of Example IV is repeated except that the melt has the following composition:

| | Wt. percent |
|---|---|
| $CrCl_2$ | 12 |
| $CrCl_3$ | 66 |
| KCl | 22 |
| | 100 |

The reaction effluent contains methacrylonitrile.

EXAMPLE XIV

The procedure of Example V is repeated except that the melt has the following composition:

| | Wt. percent |
|---|---|
| $CoCl_2$ | 43 |
| $CoCl_3$ | 17 |
| KCl | 40 |
| | 100 |

The reaction effluent contains benzonitrile.

The process of the invention is an improvement over conventional ammoxidation processes in that unsaturated aliphatic nitriles, such as acrylonitrile, may be produced from a saturated hydrocarbon such as propane. In addition, the ammoxidation may be effected without the necessity of employing hydrocarbon-oxygen mixtures. These advantages and other advantages should be apparent from the teachings contained herein.

Numerous modifications and variations of the present invention are possible in light of the above teachings and, therefore, the invention may be practiced in a manner other than as particularly described.

What is claimed is:

1. A process for producing nitriles, comprising:
contacting, at a temperature from about 500° F. to about 1200° F., at least one hydrocarbon selected from the group consisting of alkanes having 2–18 carbon atoms and alkenes having 2–18 carbon atoms with ammonia and a member selected from the group consisting of (a) a molten mixture of a multivalent metal halide in both its higher and lower valence state and a molecular oxygen-containing gas; and (b) a molten mixture of a multivalent metal halide in both its higher and lower valence state and the corresponding oxyhalide of the multivalent metal, wherein the multivalent metal halide of (a) and (b) is selected from the group consisting of the bromides and chlorides of manganese, cobalt, chromium, copper and iron, to produce a hydrocarbon mononitrile.

2. A process for producing nitriles, comprising:
contacting, at a temperature from about 500° F. to about 1200° F., at least one hydrocarbon selected from the group consisting of alkanes having 2–18 carbon atoms and alkenes having 2–18 carbon atoms, ammonia and a molecular oxygen-containing gas with a molten mixture of a multivalent metal halide in both its higher and lower valence state, wherein the multivalent metal halide is selected from the group consisting of the bromides and chlorides of manganese, cobalt, chromium, copper and iron, to produce a hydrocarbon mononitrile.

3. The process as defined in claim 2 wherein the multivalent metal halide is a chloride.

4. The process as defined in claim 2 wherein the higher and lower valent metal halide is cupric and cuprous chloride.

5. The process as defined in claim 4 wherein the molten mixture further includes as a melting point depressant a metal halide selected from the group consisting of the chlorides and bromides of the alkali metals and the heavy metals of Groups I–IV in an amount to maintain the mixture in the molten state at the reaction temperature.

6. The process as defined in claim 5 wherein the melting point depressant is an alkali metal chloride.

7. The process as defined in claim 6 wherein the alkali metal chloride is potassium chloride.

8. The process as defined in claim 7 wherein the hydrocarbon is an alkene containing from 3 to 6 carbon atoms.

9. The process as defined in claim 8 wherein the alkene is propylene and the hydrocarbon mononitrile is acrylonitrile.

10. The process as defined in claim 9 wherein the alkene is isobutylene and the hydrocarbon mononitrile is methacrylonitrile.

11. The process as defined in claim 7 wherein the hydrocarbon is an alkane containing from 3 to 6 carbon atoms and the contacting is effected at a temperature from about 700° F. to about 1200° F.

12. The process as defined in claim 11 wherein the alkane is propane and the hydrocarbon mononitrile is acrylonitrile.

13. The process as defined in claim 11 wherein the alkane is isobutane and the hydrocarbon mononitrile is methacrylonitrile.

14. The process as defined in claim 7 wherein the molten mixture further includes a promoter selected from the group consisting of the chlorides and oxides of arsenic, antimony, molybdenum and uranium and the oxide of manganese in an amount from about 1% to about 5% by weight, and the oxide and chloride of bismuth in an amount from about 1% to about 10%, by weight.

15. A process for producing nitriles, comprising:
contacting, at a temperature from about 500° F. to about 1200° F., at least one hydrocarbon selected from the group consisting of alkanes having 2–18 carbon atoms and alkenes having 2–18 carbon atoms and ammonia with a molten mixture of a multivalent metal halide in both its higher and lower valence state and the corresponding oxyhalide of the multivalent metal, wherein the multivalent metal halide is selected from the group consisting of the bromides and chlorides of manganese, cobalt, chromium, copper and iron, to produce a hydrocarbon mononitrile.

16. The process as defined in claim 15 wherein the multivalent metal halide is a chloride.

17. The process as defined in claim 16 wherein the contacting is also effected with molecular oxygen.

18. The process as defined in claim 16 wherein the molten mixture is a mixture of cuprous chloride, cupric chloride and copper oxychloride.

19. The process as defined in claim 18 wherein the molten mixture further includes as a melting point depressant a metal halide selected from the group consisting of the chlorides and bromides of the alkali metals and the heavy metals of Groups I–IV in an amount to maintain the mixture in the molten state at the reaction temperature.

20. The process as defined in claim 19 wherein the melting point depressant is an alkali metal chloride.

21. The process as defined in claim 20 wherein the alkali metal chloride is potassium chloride.

22. The process as defined in claim 21 wherein the hydrocarbon is an alkene containing from 3 to 6 carbon atoms.

23. The process as defined in claim 22 wherein the alkene is propylene and the hydrocarbon mononitrile is acrylonitrile.

24. The process as defined in claim 22 wherein the alkene is isobutylene and the hydrocarbon mononitrile is methacrylonitrile.

25. The process as defined in claim 21 wherein the hydrocarbon is an alkane containing from 4 to 6 carbon atoms and the contacting is effected at a temperature from about 700° F. to about 1200° F.

26. The process as defined in claim 25 wherein the alkane is propane and the hydrocarbon mononitrile is acrylonitrile.

27. The process as defined in claim 25 wherein the alkane is isobutane and the hydrocarbon mononitrile is methacrylonitrile.

28. The process as defined in claim 21 wherein the melt further includes a promoter selected from the group consisting of the chlorides and oxides of arsenic, antimony, molybdenum and uranium and the oxide of manganese in an amount from about 1% to about 5%, by weight, and the oxide and chloride of bismuth in an amount from about 1% to about 10%, by weight.

References Cited
UNITED STATES PATENTS 3,489,788   1/1970   Clark et al. _____ 260—465.3

JOSEPH P. BRUST, Primary Examiner

U.S. Cl. X.R.

260—465 C